United States Patent
Eisen et al.

(10) Patent No.: US 8,612,854 B2
(45) Date of Patent: Dec. 17, 2013

(54) METHODS AND APPARATUS FOR SECURELY DISPLAYING DIGITAL IMAGES

(75) Inventors: Ori Eisen, Scottsdale, AZ (US); Raz Yalov, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 712 days.

(21) Appl. No.: 11/612,425

(22) Filed: Dec. 18, 2006

(65) Prior Publication Data

US 2007/0183000 A1    Aug. 9, 2007

Related U.S. Application Data

(60) Provisional application No. 60/751,188, filed on Dec. 16, 2005.

(51) Int. Cl.
*G06F 7/00* (2006.01)

(52) U.S. Cl.
USPC ............ 715/271; 715/221; 715/229; 715/272

(58) Field of Classification Search
USPC ......... 715/200, 221, 222, 223, 229, 243, 246, 715/247, 253, 255, 271, 272
See application file for complete search history.

(56) References Cited

U.S. PATENT DOCUMENTS

| | | | |
|---|---|---|---|
| 4,912,761 A | 3/1990 | Tan et al. | |
| 5,184,849 A | 2/1993 | Taylor | |
| 5,491,735 A | 2/1996 | Hsieh | |
| 5,748,780 A | 5/1998 | Stolfo | |
| 5,886,334 A | 3/1999 | D'Entremont et al. | |
| 6,078,907 A * | 6/2000 | Lamm | 705/40 |
| 6,327,384 B1 * | 12/2001 | Hirao et al. | 382/173 |
| 6,567,099 B1 * | 5/2003 | Dawson | 345/611 |
| 6,646,765 B1 * | 11/2003 | Barker et al. | 358/474 |
| 6,803,920 B2 * | 10/2004 | Gossett et al. | 345/591 |
| 6,954,532 B1 | 10/2005 | Handley et al. | |
| 7,002,712 B2 | 2/2006 | Barker et al. | |
| 7,039,505 B1 * | 5/2006 | Southard et al. | 701/3 |
| 7,130,858 B2 | 10/2006 | Ciaramitaro et al. | |
| 7,272,610 B2 * | 9/2007 | Torres | 707/101 |
| 7,292,723 B2 | 11/2007 | Tedesco et al. | |
| 7,363,170 B2 | 4/2008 | Seul et al. | |

(Continued)

FOREIGN PATENT DOCUMENTS

WO    WO 2007/045818 A1    4/2007

OTHER PUBLICATIONS

Banking Services Newsletter: Keeping You Up-to-Date on Banking Developments throughout the UC System. UCOP-Banking Services Group. Dec. 2005. (8 pages).
Darlin, Damon. Opening the door on credit reports and pitching the lock. The New York Times. Mar. 18, 2006. (2 pages).

(Continued)

*Primary Examiner* — Stepehn Hong
*Assistant Examiner* — Gregory J Vaughn
(74) *Attorney, Agent, or Firm* — Wilson Sonsini Goodrich & Rosati

(57) ABSTRACT

The invention provides methods and apparatus for securing personalized or sensitive information appearing in digital images. Digital images containing information to be secured is processed and divided into a plurality of image cells. At least one image cell from the plurality of image cells is selected and redacted or altered to render the information to be secured with the selected image cells indecipherable. The invention also provides methods and apparatus for redacting information to be secured in a high throughput automated process.

20 Claims, 10 Drawing Sheets

(56) References Cited

U.S. PATENT DOCUMENTS

| | | | |
|---|---|---|---|
| 7,401,082 B2 | 7/2008 | Keene et al. | |
| 7,475,242 B2 | 1/2009 | Baird et al. | |
| 2001/0046096 A1* | 11/2001 | Worden | 360/13 |
| 2002/0041328 A1* | 4/2002 | LeCompte et al. | 348/144 |
| 2002/0083079 A1* | 6/2002 | Meier et al. | 707/104.1 |
| 2003/0002732 A1* | 1/2003 | Gossett et al. | 382/164 |
| 2003/0002740 A1* | 1/2003 | Melikian et al. | 382/217 |
| 2003/0033161 A1* | 2/2003 | Walker et al. | 705/1 |
| 2003/0115481 A1 | 6/2003 | Baird et al. | |
| 2004/0004733 A1* | 1/2004 | Barker et al. | 358/1.13 |
| 2004/0088313 A1* | 5/2004 | Torres | 707/101 |
| 2004/0260876 A1* | 12/2004 | Singh et al. | 711/117 |
| 2005/0039034 A1 | 2/2005 | Doyle et al. | |
| 2005/0039219 A1 | 2/2005 | Cooper et al. | |
| 2005/0111054 A1 | 5/2005 | Umeda | |
| 2005/0185225 A1 | 8/2005 | Brawn et al. | |
| 2005/0246551 A1 | 11/2005 | Dondl et al. | |
| 2006/0008779 A1* | 1/2006 | Shand et al. | 434/90 |
| 2006/0126829 A1 | 6/2006 | Lai | |
| 2006/0161501 A1 | 7/2006 | Waserstein et al. | |
| 2007/0094594 A1* | 4/2007 | Matichuk et al. | 715/530 |
| 2008/0002911 A1 | 1/2008 | Eisen et al. | |
| 2008/0204788 A1* | 8/2008 | Kelly et al. | 358/1.15 |

OTHER PUBLICATIONS

Techweb News: Wells Fargo Intros Anti-Theft Alerts. Available at http://techweb.com/wire/166404177. Accessed Mar. 20, 2006. (1 page).

UPIC Marketing Guide—The Clearing House. Available at http://www.upic.coni/infofiles/UPIC_Marketing_Guide.pdf. Accessed Dec. 19, 2006. (17 pages).

Bharosa Press Release. Bharosa announces online authentication solution to counter check 21-based fraud. Nov. 7, 2005. Available at http://www.bharosa.corn/news/PR-110705.html. Accessed Jan. 18, 2007. (2 pages).

Bharosa Products: Bharosa Virtual Authentication Devices—CheckPad: Secure check viewing online. Available at http://bharosa.com/authenticator.html. Accessed Jan. 18, 2007. (3 pages).

European search report dated Oct. 27, 2008 for Application No. 08159110.9.

European search report dated Mar. 13, 2009 for Application No. 06845722.5.

International search report dated Feb. 26, 2008 for PCT/US2006/48251.

Office action dated Feb. 15, 2011 for U.S. Appl. No. 11/769,674.
Office action dated Jul. 1, 2013 for U.S. Appl. No. 11/769,674.
Office action dated Oct. 11, 2012 for U.S. Appl. No. 11/769,674.
Office action dated Nov. 8, 2011 for U.S. Appl. No. 11/769,674.

* cited by examiner

Jane Doe
101 Anydrive
Hometown, IN 46278

FRN (Fractional Routing Number)

5600

12-345/678 -OR- 12-3456/789

PAY TO THE
ORDER OF

DATE $

DOLLARS

SIGNATURE 123456789 123456789101112 5600

METHODS AND APPARATUS FOR SECURELY DISPLAYING DIGITAL IMAGES

This application claims the benefit of priority to U.S. Provisional Patent Application No. 60/751,188 filed on Dec. 16, 2005, which is incorporated herein by reference in its entirety.

FIELD OF THE INVENTION

The invention relates to securely displaying digital images of documents containing selected or confidential information. More particularly, the invention relates to methods and apparatus for altering or redacting digital images of documents for viewing such as personal checks in order to secure sensitive information.

BACKGROUND

Converting a paper hardcopy document into a digital image may be desirable due to the ease with which it can be transmitted and processed by a computer system. For example, images of documents can be scanned and transmitted via e-mail or shared on the Internet using a variety of known protocols such as HTTP or FTP. Obtaining a digital image of a document may also be advantageous so that it can be manipulated or edited on a computer system. Electronic transmissions of digital images are frequently preferred over traditional postal methods due to speed of delivery and the ever increasing number of computer systems and our reliance thereon.

The U.S. Congress recognized the advantages of using digital versions of checks over paper versions thereof by passing the Check 21 Act enacted in 2003. The Check 21 Act allows a financial institution to create a digital version of a processed check and make it accessible online to the payer of the check, thereby eliminating the need for further handling or return of the paper check. This computerized process greatly reduces the time and costs associated with the processing of paper checks, and hence enhances the efficiency of our banking system. It also provides an easy and convenient alternative for bank customers to monitor and manage banking related documents and activities. Online checking offered by many financial institutions such as Bank of America and Wells Fargo allows customers to conveniently view digital images of their cashed checks.

However digital images of documents may often contain personal or sensitive information that a customer or a user may wish to conceal. The term "sensitive information" may include anything designated by a party that should be secured for viewing online such as a customer's name, address or telephone number in conjunction with the customer's social security number, driver's license, or account number (FDIC FIL-27 2005).

At the same time, images must also reveal or contain sufficient information that is legible or usable to the user. For example, banks and other kinds of financial institutions allow a user to access an online bank account and view a digital image of a processed check or financial document. But sensitive information such as the customer's name, bank account number, routing number, address, telephone number, signature and other personal information, may appear on a computer screen while viewing a digital version of the check. The security of such personalized or sensitive information is compromised when it is displayed. The customer or user may therefore wish to hide or secure such personalized information from computer hackers, identity thieves, or even from viewers with no ill intentions.

A variety of graphics editing programs are available today such as Adobe Photoshop that allows a digital image to be edited or altered manually. Original versions of an image may be created and saved as a new image. When using such software programs, a user often manually edits the personalized or sensitive content of the individual digital image with an editing tool such as a blur tool included with the software. Meanwhile, banks and other financial institutions usually process large quantities of checks and/or documents containing personalized or sensitive information. A financial institution may have numerous customers, each with an online bank account on which they can view digital versions of a processed or cashed check. The digital image may be conveniently displayed to a customer while at the same time the financial institution can avoid having to mail or return the processed check to the customer. The ability to efficiently process a large number of checks while protecting personal information contained therein presents significant challenges in online security and the prevention of fraud or theft.

A need therefore exists to secure and protect personalized or sensitive information within digital images of documents. It would be further advantageous to protect available information online without having to manually and singularly edit or alter the contents of the digital images.

SUMMARY OF THE INVENTION

The invention provides methods and apparatus for securing selected information contained within digital images of documents. Various aspects of the invention described herein may be applied to any of the particular applications set forth below or for any other types of information that is displayed for viewing. The invention may be applied as a standalone tool or as part of an integrated software solution against online fraud and identify theft. The invention can be optionally integrated into existing business processes seamlessly. It shall be understood that different aspects of the invention can be appreciated individually, collectively or in combination with each other.

A preferable embodiment of the invention provides image masking systems and methods for providing online banking customers with necessary or shared information online without exposing sensitive data to potential fraud. Such image masking can be performed real-time or on-the-fly to a presented image only without necessarily altering an originally scanned document. An originally scanned image can be remain intact and unaltered while a new revised or redacted digital image can be created. The modified or redacted digital image offers customers access to pictorial or graphical images of corresponding paper documents without compromising account or personal identity information that should be kept secured. Such information can be blurred by various digital editing techniques such as blurring or pixelating or shading.

Accordingly, the invention can provide numerous advantages over other available and complicated document security solutions by protecting sensitive customer data from fraud and identify theft without involving customer education, adoption or enrollment. No enrollment process or change of behavior is required on the part of customers. The security processes provided in accordance with the invention can be performed on the back end, invisible to users which can thereby enhance their sense of security without adding inconvenience or latency to the online experience (automated back-end security). While the masked images of secured documents herein may be helpful for daily use, customers can still request to view and access an unredacted version of the already scanned document when appropriate security measures are in place such as further password or other authentication factors (e.g., SiteKey).

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized:

FIGS. 5-8 describe another embodiment of the invention that converts a first digital image of a document such as a check into a second redacted digital image containing selectively pixelated image cells that can be securely displayed.

DETAILED DESCRIPTION OF THE INVENTION

The invention is directed to methods and apparatus for modifying or altering digital images of documents in order to secure selected information contained therein. The selected information may include personalized or sensitive information or any content which can be redacted or hidden from view in accordance with the invention. The selected information may be hidden in an altered digital image so it can be secured from view. Another aspect of the invention provides high throughput automated processes and apparatus for securing or altering of digital images of hardcopies of documents. The invention further provides computer systems and software programs that include instructions to carry out or perform various steps of such methods.

Figure 1:
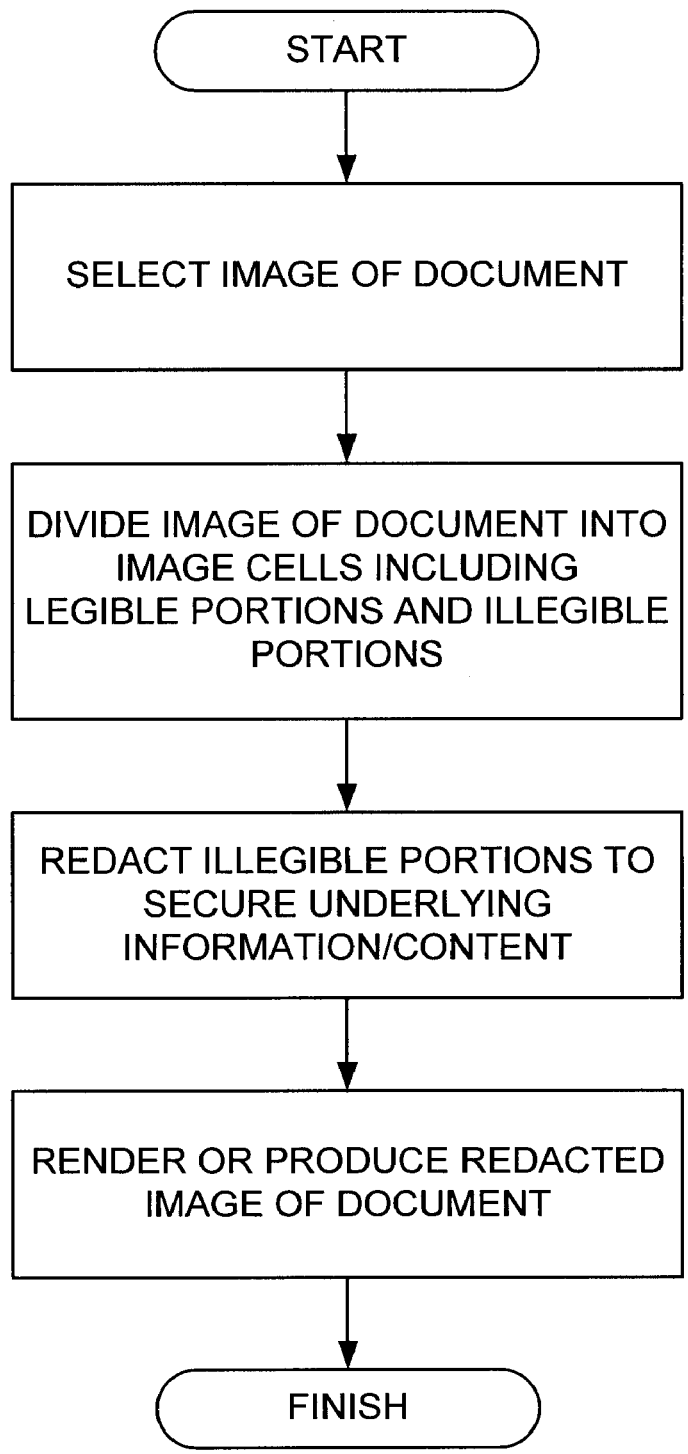
FIG. 1 describes methods of securing personalized or sensitive information displayed within a digital image of a document.

FIG. 1 describes an aspect of the invention that provides methods for securing selected information contained within a digital image. The digital image to be displayed may be derived from a scanned paper hardcopy document or any computer generated illustration that contains personalized or sensitive information or content. Upon selection of the digital image, it can be divided into a plurality of image cells that can be characterized or designated as either legible portions or illegible portions of the document or image. The legible portions of the image may present non-sensitive or non-personal information that a user may wish to display. The illegible portions of the image may however include sensitive, financial or personal information that should not be displayed. The image cells corresponding to illegible portions of the image may be redacted to hide or obscure the underlying information contained in the image. Meanwhile, the image cells corresponding to legible portions of the image can remain unredacted and visible so as to reveal content or images located therein. The resulting redacted or altered digital image can be useful in many respects and communicate sufficient context or information but not so far as to compromise or unnecessarily reveal sensitive information. Accordingly, the redacted image of the document can be rendered or available for display online in a controlled and secure manner.

A preferable embodiment of the invention provides a method of securely displaying digital images of banking related documents. The method comprises selecting a first digital image of a banking related document containing personalized content, dividing the first digital image into a plurality of image cells, and then redacting at least one of the image cells to provide a second digital image wherein the personalized content in the banking related document is illegible (see FIGS. 2-4). This methodology can be applied to a variety of digital images corresponding to checks (personal or business check images) from financial institutions or any hardcopy document outside of banking transactions. Other preferable embodiments of the invention can be directed to documents or digital images thereof such as deposit slips, bank statements, brokerage statements, legal documents, credit card bills, as well as tax documents or returns, driver's licenses, medical records or any other document containing personalized or sensitive information that a user may wish to hide or conceal from view on a computer or online. It shall be understood that the personalized or sensitive information need not be in the form of text, but may be rather a graphical image such as an illustration of an individual, fingerprint or biometric information. The documents secured in accordance with this aspect of the invention can originally exist as a paper hardcopy that can be scanned to create digital images, or the documents may be stored as digital images and stored in computer readable memory such as a computer hard drives, flash memory drives or other memory media.

Figure 2:
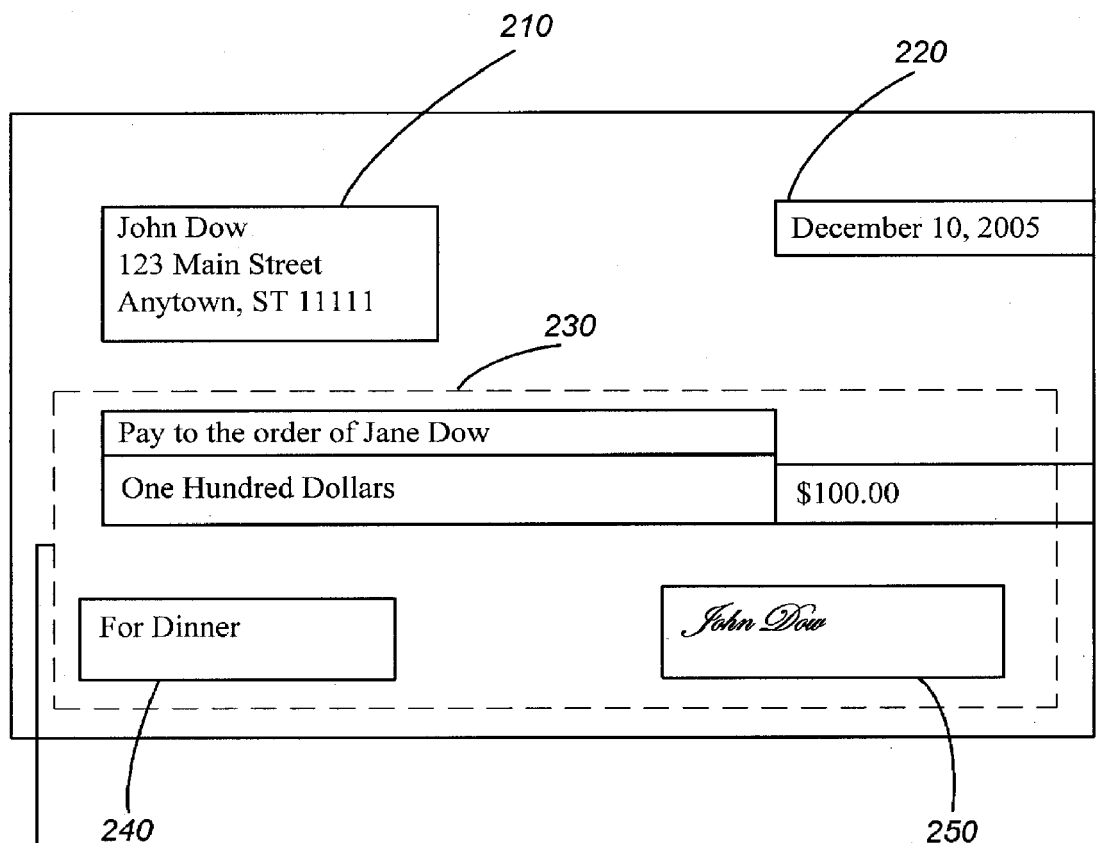
FIGS. 2-4 describe an embodiment of the invention that displays digital images of checks or other selected documents containing information to be secured.

A digital image of a check or a selected document can be chosen for secure display in accordance with the invention as shown in FIG. 2. The check or selected document can be designed with various shapes and sizes including relevant information printed thereon. Selected kinds of personalized information may be displayed or appear within the same general location or region on the face of the check or document. For example, the name and address information of an individual, e.g., payor, can be printed generally on the upper left hand corner 210 of the check or selected document. The date appears often in the upper right had corner 220. The central portion 230 of the check or selected document may contain other kinds of sensitive information. For example, with respect to any selected document, this location may include information such as credit card numbers, bank account/routing numbers, account statements from financial institutions or graphical content. It shall be understood that the invention can be applied to protecting other kinds of non-textual information such as photographs, images, blueprints or schematics that should not be readily viewable by an observer. With respect to a check, as shown in FIG. 2, the central portion 230 often includes the name of the payee or to whom the check is written. The dollar amount for the check appears immediately below usually written or spelled out (one hundred dollars) as well as appearing numerically ($100). A memo line is also provided to the lower left hand corner 240 of the check that identifies for what the check was written. A space or line 250 can be provided at the lower right hand corner of the check where the signature of the payor appears.

Figure 3:
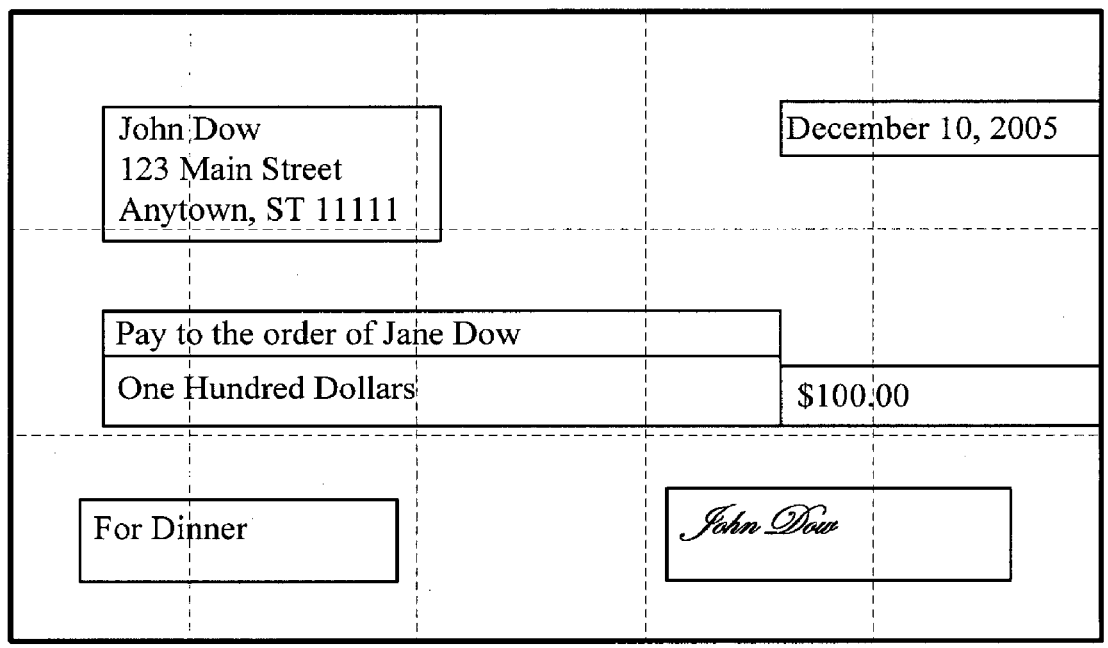

As shown in FIG. 3, the check can be conceptually divided into a plurality of image cells in accordance with the invention. The digital image of the check can be divided into a grid consisting of five (5) columns×three (3) rows. As with other embodiments of the invention described elsewhere herein, the image cells within the grid may be designated or separated into either redacted or un-redacted portions or cells. In some embodiments of the invention, the number of image cells within the grid may be predetermined or fixed by the party who wants to secure confidential information such as a payor or a bank having the account from which the check will be drawn against. When more image cells are selected, greater control can be provided over which regions of a check or a selected document can be secured in accordance with the invention. It shall be understood that the grids described herein may include any number of desired columns/rows and are not limited to rectangular or square shapes and can include image cells with different symmetrical or asymmetrical shapes and sizes.

Alternatively, the number and/or kind of image cells can be user defined. A user may select various image cell inputs designating the size, shape, and number of rows and columns for a desired grid. For example, a digital image can be divided into a plurality of image cells located within a rectangular grid based on user input values with a predefined number of rows and columns, e.g., 4 columns×3 rows. The grid may be characterized as a conceptual overlay upon the image so that the image can be broken-up or segmented into image cells that pertain to both redacted and un-redacted portions of the digital image. It shall be understood that image cells are not necessarily laid out in a grid like pattern with both rows and columns and can be alternatively arranged in any manner including a layout with cells that are aligned in only horizontal rows or only vertical columns.

Figure 4:
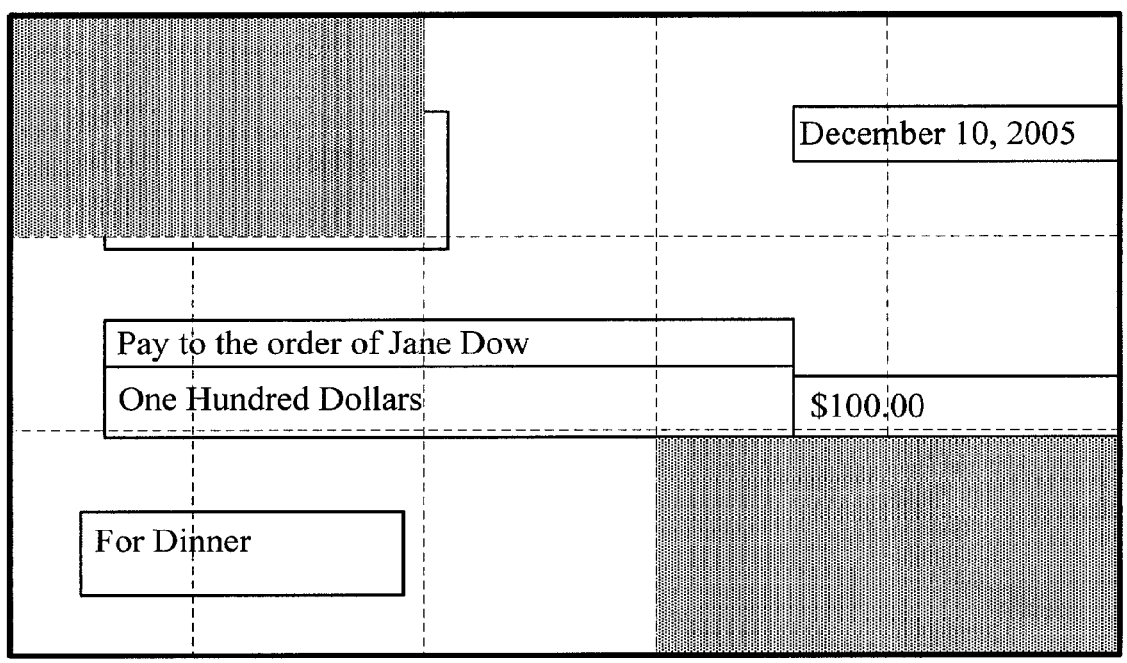

By selectively altering redacted portions of the digital image as shown in FIG. 4, sensitive information contained within the check or selected document can be protected. For example, one or more selected image cells containing sensitive information can be identified within the grid. These image cells can be designated as the ones for editing or redaction. The image fragments contained within these selected image cells or redacted cells can be altered in appearance in accordance with the invention. Meanwhile, the remaining or non-selected image cells can be left untouched so that corresponding image fragments contained therein are plainly visible. Any graphics editing software tool or program may be used to alter or change the appearance of the image fragments within the selected image cells so that the sensitive information contained within the selected image cells will not be legible to an ordinary observer. In a preferable embodiment, the selected image cells can be grayed out (colored grey) entirely as shown so that any traces of the image fragments are not visible. Two selected image cells located at the upper left hand corner of the digital image and two selected image cells located at the lower right hand corner can be redacted to protect sensitive information otherwise visible; namely the name and address of the payor and a corresponding signature. Accordingly, the resulting digital image of the check or selected document can be displayed online or on a computer screen securely without sharing or disclosing sensitive information.

There are a variety of ways in which digital images can be redacted in accordance with the invention. For example, the step of redacting selected portions of a digital image can be achieved by different means including graying or blacking out these areas. For purposes of this invention, the term "redacted" can mean a blurred, obscured, removed, blocked out, or crossed out so that underlying information cannot be seen and is not apparent on its face to an ordinary observer. Preferably, personalized information protected in accordance with the invention includes confidential subject matter such as personal data, financial or other types of information that can or should be shielded from general public viewing. Other ways to redact digital images in accordance with the invention include pixelating or pixelizing, encrypting or otherwise rendering selected regions of a digital image illegible or indecipherable. In preferable embodiments of the invention, some legible portions of the digital image remain unredacted or plainly visible to reveal image fragments or contents of the document residing within these portions. It is often useful to provide at least some context and to relay some minimal amount of information to an observer but not to the extent such that sensitive information is revealed beyond an intended purpose.

FIG. 5 illustrates another embodiment of the invention that securely displays a digital image of a personal check containing a variety of sensitive information including a series of important numbers relating to a banking account. For example, a 9-digit number American Banking Association (ABA) routing transit number can be found at the bottom of the check adjacent to an account number from a financial institution. The ABA number or routing transit number is a sensitive piece of information that is often necessary to reorder checks, to set up direct deposits and recurring payments, or when preparing a wire transfer. The customer bank account number is another piece of sensitive information that should be guarded carefully to prevent identity theft and fraud. For many online banking purposes, it is not necessary to display these series of numbers. For example, a bank customer may just want to determine whether a check has been properly endorsed, or by whom, by viewing an image of the back of a check. The customer may also want to inspect the front face of the check to confirm there has been no forgery or unauthorized alterations made. The unsecured display of such information online thus presents exposure to both the customer and the financial institution with no intended benefit in such circumstances. Accordingly, any digital images of checks that are available online can be secured in accordance with the invention to prevent unauthorized viewing by hackers or other persons who gain access to viewable online account information.

As shown in FIG. 5, the check includes additional personalized or sensitive information such as the payor name and address, a signature line, and routing transit/bank account numbers. Upon writing and cashing the check, a digital image of the instrument can be created using available scanning equipment and processes by a financial institution. It can be redacted and secured in accordance with the invention as described elsewhere herein. However a financial institution such as a bank may determine a methodology or process beforehand in which the check and other similar checks can be secured for online display. For example, the check can be initially scanned and saved. Digital images can be saved and loaded into memory of any type of computer system or network maintained by the financial institution. The digital image may be saved as a file that can be edited in accordance with the invention, or in other embodiments, the image may be derived from a stream of data as with other embodiments described herein. It shall be understood again that invention can be applied to electronic or digital images of any type of document where it may be desirable to alter the content of the image such that at least a portion of the image cannot be seen or is illegible. Electronic images of other documents may be selected besides personal checks such as deposit slips, bank statements, credit card bills, tax returns, or any other documents that may contain sensitive or personal information. In addition, the digital image of a hardcopy of a document may exist in various known formats including without limitation the following commonly used graphics file formats for displaying digital images on the World Wide Web: JPEG/JPG, GIF, PNG, TIF, TIFF, BMP, PSD, WMF, EMF, PCX, PIC and PDF.

Figure 6:
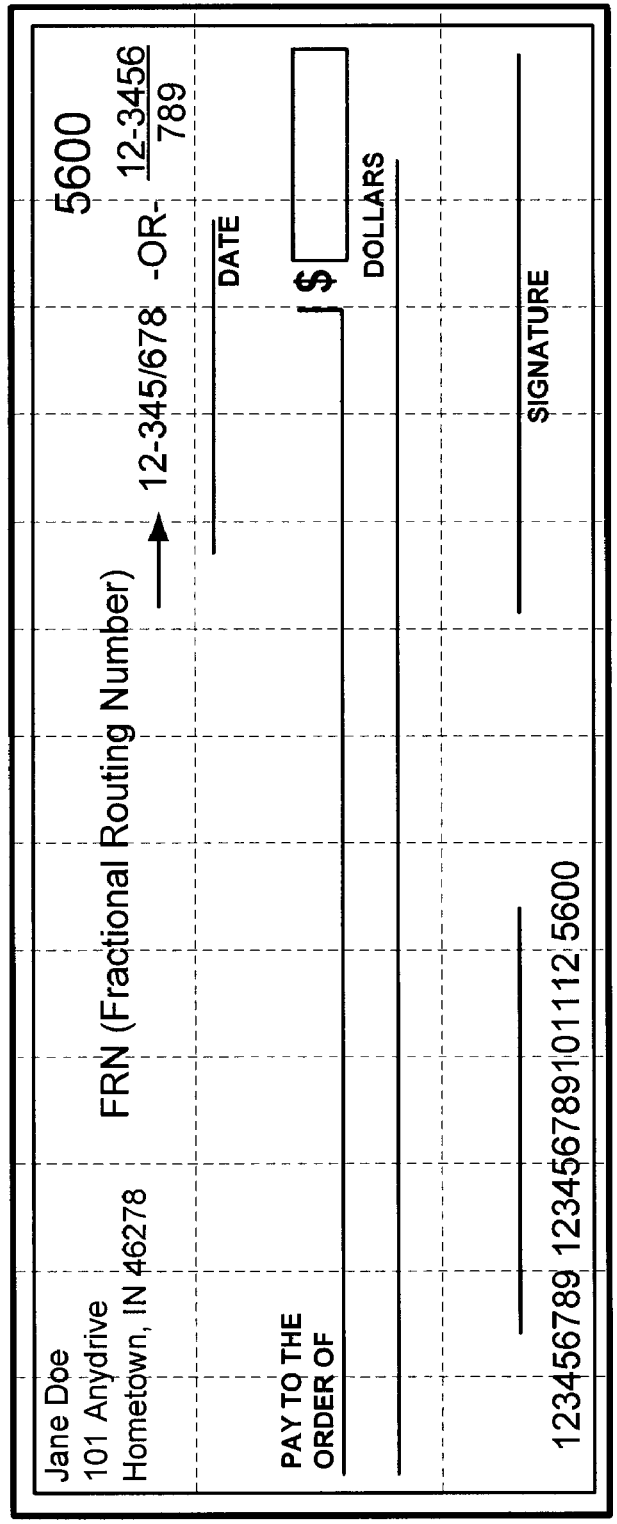

In a preferable embodiment of the invention, as shown in FIG. 6, the financial institution can divide the digital image of the check into a plurality of image cells. A grid can be formed over the check or its image to provide a series of image cells arranged in rows and columns. While any number of image cells may be chosen and arranged in different ways, the check as shown is divided into thirty-nine (39) sections. The grid can be thus designed with three (3) rows and thirteen (13) columns. When more image cells are defined in accordance with this aspect of the invention, more flexibility is often provided in redacting selected portions of the check. The number of selected image cells or the number of rows or columns into which the digital image is divided may be based on user input. In this embodiment of the invention, the grid is created with vertical and horizontal lines such that the image is divided into rectangular-shaped image cells while in other embodiments the grid may comprise curved lines, or lines that do not form a regular pattern. Other embodiments may include any combination of the above, or may include any other division of the image as may be desired to carry out the invention. The image may be divided into any number of image cells which may be of any size, shape, orientation, or other configuration.

In some embodiments of the invention, a group of image cells formed within a grid can be identified by a marker to distinguish the image cell relative to others within the entire electronic image. The marker may be a reference number according to a numbering convention. In an exemplary numbering system, the image cells may be designated with sequential numbers starting with zero (0) or one (1) in the upper left corner of the grid. The image cells may be assigned numbers from left to right (each column) and continue from top to bottom (each row). While any unique identifier or number may be assigned in any order, methods are provided herein whereby each image cell is assigned a unique number until all image cells are identified. Other numbering or marking systems may be used to designate the position of the image cells within the grid including but not limited to an alphabetical system (A-Z), an alphanumeric system (A1, A2 . . . Z10) or a color coded system may be used to uniquely label the plurality of image cells. In some embodiments of the invention, a simple binary-type cell identifier system can be also adopted. Each image cell would not have to be uniquely identified from every other image cell. For example, each image cell corresponding to a portion of a digital image may be designated either as a redacted cell or not (un-redacted cell). Any or all image cells designated as redacted cells can be altered while un-redacted cells remain visible in accordance with this embodiment the invention.

Figure 7:
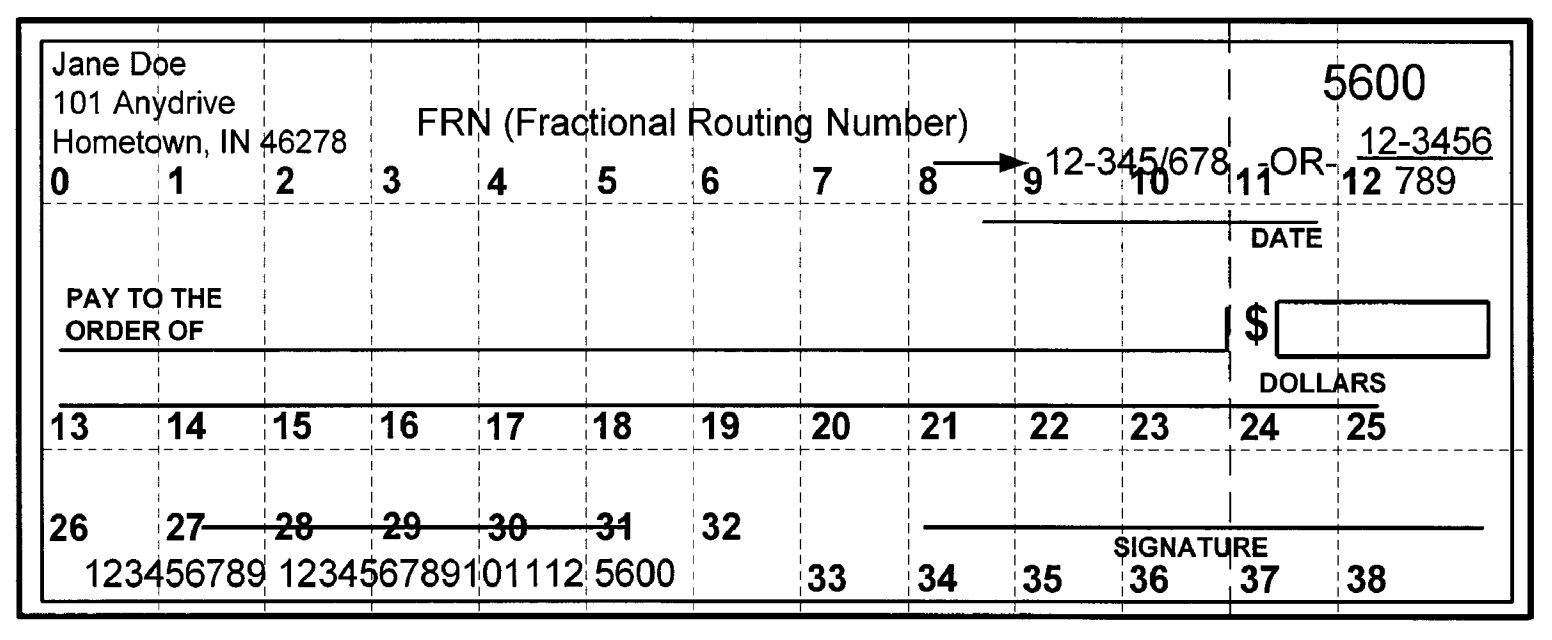

FIG. 7 illustrates a preferable embodiment of the invention whereby a plurality of image cells is identified using numerical cell identifiers ranging from zero (0) to thirty-eight (38). The cell identifiers begin with the number zero (0) in the upper left cell and may continue sequentially across the columns and in a row-by-row manner until all image cells are assigned a number ending with the number thirty-eight (38). Three rows of thirteen image cells are therefore created to provide a thirteen (13) by three (3) grid corresponding to portions of the digital image. In accordance with this aspect of the invention, the digital image may be redacted according to selected cell identifiers. This redaction may be accomplished by selecting a group of one or more cell identifiers corresponding to portions of the digital image containing sensitive information. The image fragments residing within these image cells can be redacted. Selecting cell identifiers for redaction may be accomplished by user input indicating which image cell identifiers, and thus their corresponding image cells, are to be redacted. A computer program may also include instructions or computer code to automatically select which image cell(s) are to be redacted based on corresponding image cell identifiers. Such computer code may further carry out steps to automatically redact a digital image according to selected cell identifiers. Accordingly, a first digital image can be altered by having at least one image cell redacted to provide a second digital image wherein the redacted image cell is illegible, thus securing personalized content.

Figure 8:
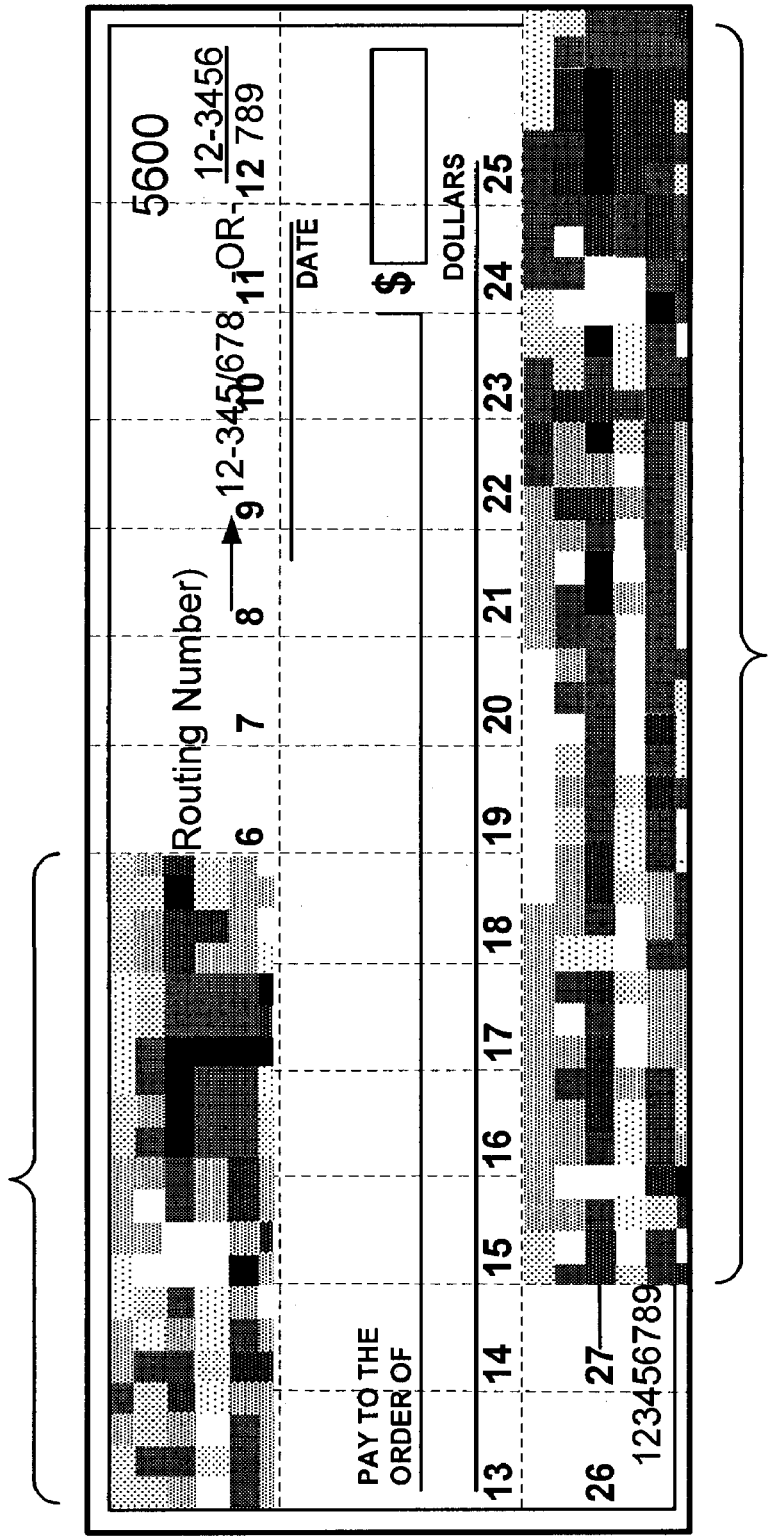

As shown in FIG. 8, a predefined group of image cells within the grid can be selected for redaction. Because the name and address of an individual often appears on the upper left hand corner of a check, image cells 1 through 5 can be selected for redaction as these cells correspond to that portion of the document or digital image. At the same time, since the routing transit and bank account numbers often appear along the bottom edge of a check, image cells 28 through 38 can be selected for redaction as these cells correspond to that portion of the check. Any number of image cells may be selected for redaction in order to partially or entirely secure information. For example, partial routing transit numbers may partially appear while the entire account number for a payor is completely illegible. In other instances it may be necessary or desired to reveal certain kinds of information appearing on the check such as the fractional routing number (FRN). So the image cells corresponding to this portion of the image (e.g., image cells 9 through 10) are not selected for redaction. Upon selection of the image cells that are to be redacted, a graphics editing tool or program can be used to redact those portions of the image in order to protect otherwise visible information. In this illustrated embodiment of the invention, the image cells chosen for redaction were masked or rendered illegible by pixelating the image cells or the portions of the digital image corresponding to the image selected cells. Other methods may be used to redact the image cells besides pixelating including but not limited to graying out, encrypting, blurring, masking, or drawing a line through all or just a portion of an image cell. In alternative embodiments, the redacted cells can be blurred or pixelated, wherein the blurring or pixelating is achieved by utilizing a blur size parameter to designate the size of the blurred area. A blur size may be, e.g., but not limited to, ten (10) by ten (10) pixels.

The selected image cells to be redacted can be identified according to markers or cell identifiers that direct the editing tool or program as to which portions of the digital image should be redacted. It shall be understood that information to be secured within checks or any other selected document in accordance with the invention may reside in slightly or entirely different locations therein. An appropriate number of image cells may be chosen in order to offer at least some minimal level of security to at least partially redact information positioned within a digital image since checks or any other selected document may vary in size and shape. Accordingly, a financial institution such as a bank may therefore decide beforehand how much or which portions of customer checks should be generally available for online display.

Figure 9:
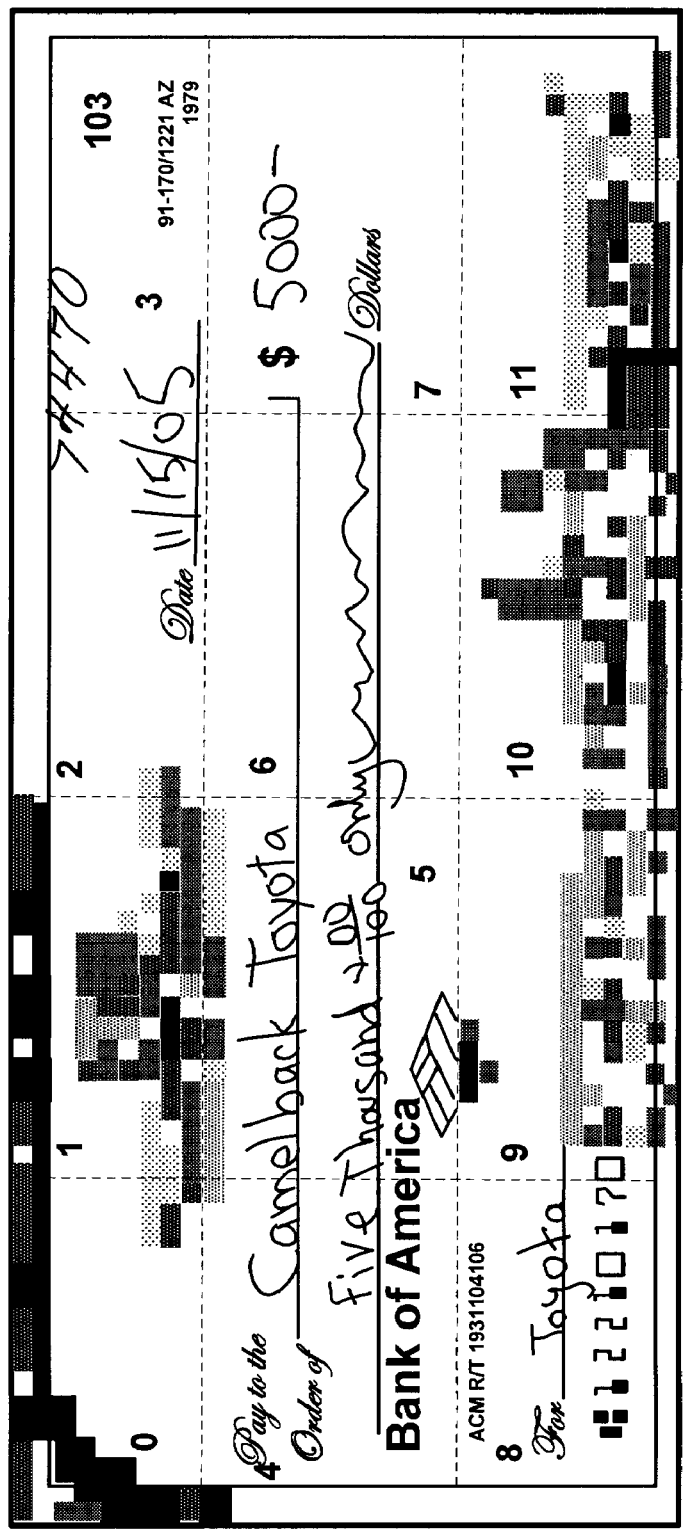
FIG. 9 illustrates a redacted digital image of a cashed personal check that is processed in accordance with another aspect of the invention.

FIG. 9 illustrates yet another embodiment of the invention that is applicable to personal checks. The personal check in this figure appears as it would to an ordinary observer on a display or monitor after it has been partially redacted in accordance with the invention. In this instance, a grid with three (3) rows by four (4) columns was selected that divides the digital image into twelve (12) image cells. After the check is cashed, the payor/account holder/customer may want to view the check on a home computer through an online banking system. Through a web browser, for example, the payor or any other person may select for viewing the cashed check (front/back images). Regardless of whether the image of the check has been intercepted or viewed by someone without permission, the relatively sensitive information contained thereon is secured in accordance with the invention. The digital image of the already scanned paper (hardcopy) document is redacted to conceal information such as the payor name and address, the routing transit and bank account numbers, plus the payor's signature which could otherwise be studied to commit forgery. Meanwhile, certain kinds of information can be visible to give some context and to convey some basic information that may be deemed useful but relatively non-sensitive or non-personal, e.g., date, name of payee, name of bank, dollar amount, purpose of check. In this illustration, image cells 0 through 1 and 9 through 11 were selected for redaction. The secured information has been redacted by pixelation and masked from view. The image cells could have been alternatively redacted by other masking techniques described elsewhere herein, or otherwise blackened or grayed out, partially or completely. As illustrated in this embodiment, selected image cells can be partially rather than entirely redacted. This degree of controlled redaction can be achieved based on the technique selected such as pixelation in this embodiment. It may be desirable to pixelate only certain portions of the image cells leaving other pixels corresponding to some image fragments within such cells intact and viewable. As with other embodiments of the invention, it may be thus desirable to only partially redact an image cell containing personalized information.

While masked or redacted images provided herein may be advantageous for securing personalized content, a user or customer may wish to view the original unredacted image or document. An alternative embodiment of the invention may offer this by presenting a complete digital image to an authorized person following an authentication procedure. A user may view an original unredacted image online after providing for example a user identification and password. It shall be understood that the invention may be also applied to digital image encryption/decryption schemes such as those disclosed in U.S. Pat. No. 6,954,532 (Handley et al), which is incorporated by reference in its entirety herein. But preferable embodiments of the invention herein can provide document security without encryption/decryption schemes or segmenting digital images into conceptual layers. For example, redacted portions of documents (e.g., pixelated) provided in accordance with the invention may be permanently altered and considered unredactable (e.g., unpixelated) by anyone including even the creator of the document. Other alternative embodiments of the invention however provide temporarily redacted documents that can be unredacted, preferably without public/private key encryption and decryption techniques wherein redacted images shared online include embedded public key information. Such keyless redaction and unredaction techniques such as pixelating/unpixelating according to graphical editing software programs (e.g., Adobe PhotoShop) that are known only by authorized users or viewers can be also be applied to embodiments of the invention herein. Alternatively, the unredacted image may be presented following some predetermined level of second level authentication online (or ordered through paper mail or made available and a local branch of a financial institution).

Figure 10:
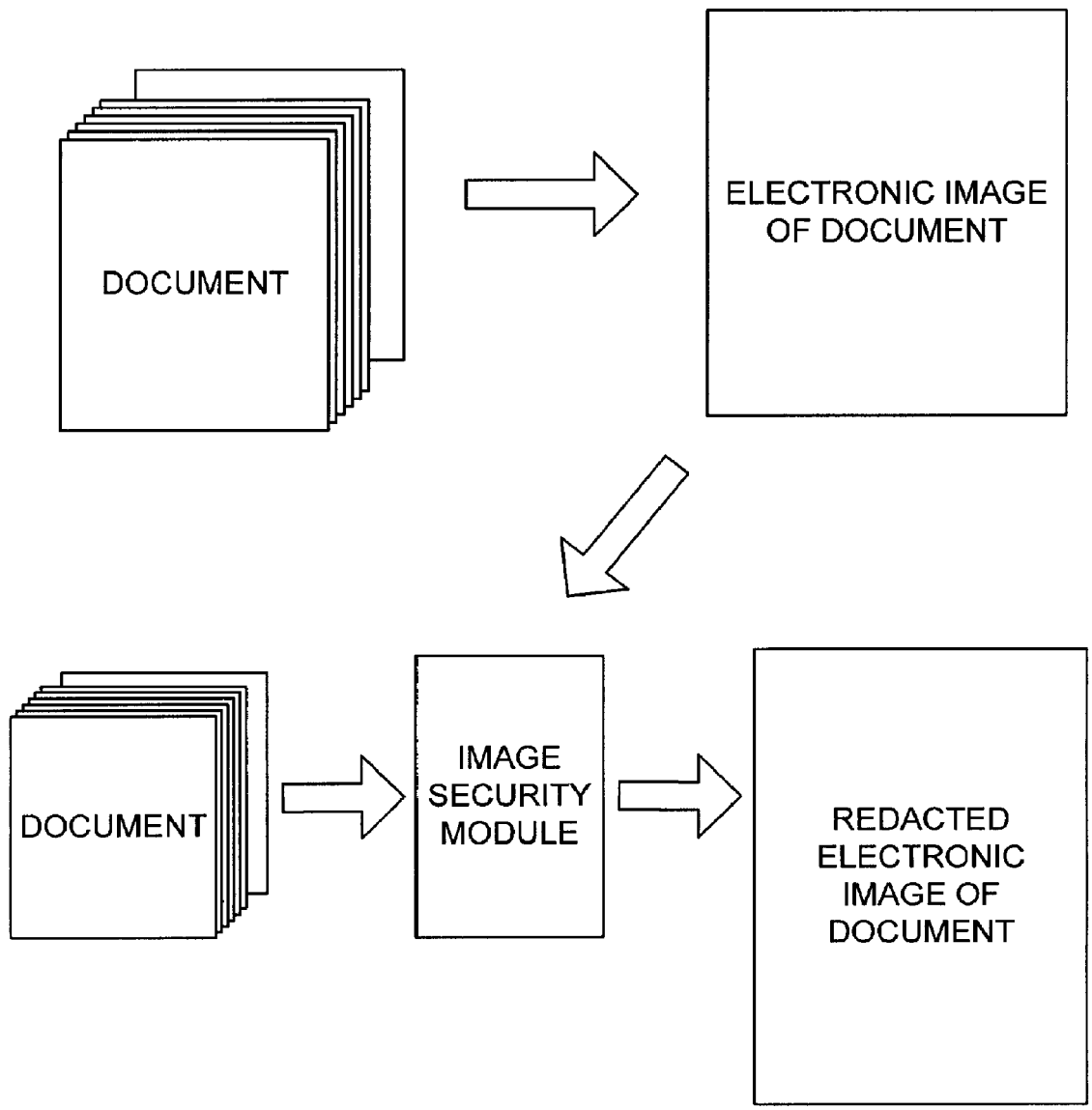
FIG. 10 describes a system for securing digital images from already digitally scanned documents or directly from paper documents with an image security module according to yet another aspect of the invention.

In accordance with yet another aspect of the invention, as shown in FIG. 10, one or more hardcopy paper documents can be modified to secure selected information contained therein. The digital image of an already scanned document can be redacted, or alternatively, paper documents can be scanned and converted directly into secured digital images. For example, an original unredacted group of one or more documents can be scanned to generate electronic images using image scanning tools or equipment. Such apparatus may have Optical Character Recognition (OCR) capabilities and be able to scan paper copies to generate unredacted digital images according to a preselected digital image format such as a JPEG format, for example. The image(s) may be subsequently redacted and converted by upon execution of a computer software program for redacting digital images that resides in the memory of a computer provided in accordance with another aspect of the invention described herein. The software program may contain an image security module that redacts selected portions of the already scanned digital images to secure certain information as described elsewhere herein. The image security module may optionally convert the first unredacted digital image existing in a first format (JPEG) into a second redacted digital image existing in a second format (PDF). It shall be understood that the image security module may operate independently as a stand alone application software program or an add-on tool for commercially available image scanning and conversion programs.

FIG. 10 illustrates another embodiment of the invention whereby paper documents are directly scanned and secured by the image security module. It shall be understood that the image security module may be a computer program or set of instructions to carry out a method of redacting digital images of hardcopy documents, or it may be a discrete set of instructions or a combination of subroutines to perform functions such as the scanning and/or redacting of documents as described herein. For example, a group of one or more selected paper hardcopy documents can be processed by the image security module to redact certain portions thereof. When the documents are relatively uniform in appearance, e.g., shape, size, font, a common group of image cells corresponding to similar portions of the documents can be scanned and redacted in accordance with other aspects of the invention described elsewhere herein. However when the documents to be scanned and redacted are not uniform, or if different regions of similar or uniform documents are to be redacted, then the image security module can selectively redact digital images accordingly such that resulting digital images of the documents protect information residing at different portions of the scanned documents. Either the redacted digital images of the paper documents can be rendered for immediate display, or they can be stored for later viewing after being processed by the image security module to mask or hide sensitive information appearing on the face of the documents. Accordingly, paper documents can be scanned and directly converted into redacted digital images by the image security module.

Various aspects of the invention herein may scan paper documents, or convert digital images of documents, into any digital image format. The following is a description of some of the most commonly used graphics file formats for putting graphics on the World Wide Web that may be applied to the invention:

JPEG/JPG. Short for Joint Photographic Experts Group, the original name of the committee that wrote the standard. JPG is an image file format supported on the Web that is a lossy compression technique designed to compress color and grayscale continuous-tone images. The information that is discarded in the compression is information that the human eye cannot detect. JPG images can support 16 million colors and are suitable for photographs and complex graphics. A user may have to compromise on either the quality of the image or the size of the file. JPG may not work well on line drawings, lettering or simple graphics.

GIF. Short for Graphics Interchange Format, another of the graphics formats supported by the Web. Unlike JPG, the GIF format is a lossless compression technique and it can support 256 colors. GIF may be viewed as a preferred format over JPG for images with only a few distinct colors, such as line drawings, black and white images and small text that is only a few pixels high. With an animation editor, GIF images can be put together for animated images. GIF also supports transparency, where the background color can be set to transparent in order to let the color on the underlying Web page to show through.

PNG. Short for Portable Network Graphics, it is another graphics standard found on the Web but is not supported by all browsers. An image in a lossless PNG file can be 5%-25% more compressed than a GIF file of the same image. PNG builds on the idea of transparency in GIF images and allows the control of the degree of transparency, known as opacity. PNG does not support animation like GIF does.

It shall be understood that the invention herein can redact and convert or produce document images from many other different types of image formats such as TIF, TIFF, BMP, PSD, WMF, EMF, PCX, PIC and PDF formats.

Another aspect of the invention provides automated high throughput processes wherein a large number of digital images can be generated and/or secured on-the-fly (real time). For example, many checks from various financial institutions often adopt a relatively standard or substantially similar format. Because checks usually include the same kinds of information, their corresponding images can be similarly redacted (batch redacted) without individual manual editing or redacting with software programs such as Adobe PhotoShop. A variety of automated processes and systems are provided herein to redact sensitive information from digital images of documents for display online or through other communication channels as part of a high throughput process. With respect to checks, the image masking systems and processes herein can leverage the fact that personal or sensitive information often appears in common locations as described elsewhere herein. The front side of a check, for example, may include the payor address in an upper left side area while the routing number and account number may appear along the bottom near the signature of the payor. Digital images of a plurality of checks, for example, can be secured or altered in an automated batch process, thus requiring less time than would be required if the images were scanned and/or secured individually. A grid constructed with a plurality of image cells can be designed for the checks as described herein so that commonly selected (or the same) image cells can be redacted on-the-fly for each corresponding check. The selection of a sufficient number and/or location of image cells for redaction may be considered in view of modest variations existing as between different checks (different sizes, fonts and layouts). Some information on checks may be more edited or redacted compared to others but enough cells should be appropriately selected for redaction in order to sufficiently mask the check images to afford at least some level of protection, e.g., at least 5 digits from a 9 digit routing transit number should be redacted while 6, 7 or more digits may be redacted in some checks. The digital images of the checks or any other document containing information to be protected herein can be therefore dynamically divided and masked in accordance with the invention on-the-fly, and preferably as part of a batch processing of checks or other documents by a financial institution, merchants and other parties desiring secure digital images.

For example, referring to FIG. 10, an image security module may perform a batch security process to securely display cashed checks for viewing by banking customers. In a preferable embodiment of the invention, the hardcopy paper versions of the checks (presumably cashed and held by a bank) can be digitally scanned using high volume paper scanners to capture and create digital images of (both front and back sides) the checks. A series of one or more image files such as PDF files can be created containing electronic images of the checks in unredacted form. This image data can be thereafter processed by the image security module to create redacted electronic images of the checks for secure viewing in accordance with other aspects of the invention described elsewhere herein. The image masking systems and methods herein can perform a wrapper function around existing image content by taking an already scanned document and blurring or redacting relevant parts of the digital image before presenting it to an end user. Alternatively, the digital image information corresponding to the checks upon scanning can be fed directly into the image security module whereby the function of redacting selected portions of the digital images are performed without generating unredacted digital versions of the checks. For some applications, it may be more useful to only create and/or store redacted electronic images of checks. No duplicate images are generated at all which reveal sensitive information according to this embodiment of the invention. Accordingly, this aspect of the invention allows a plurality of checks or any other documents with similarly located information to be redacted more efficiently and faster in time than if the digital images were redacted individually.

Other embodiments relating to this aspect of the invention can provide batch processing of digital images for other kinds of documents containing confidential or sensitive information described elsewhere herein to protect against identity theft, fraud and other kinds of illegal activity.

In an online application of the invention that securely displays digital images, the following data flow can be implemented: a user requests a page with a dynamic image content (such as a check); a server returns a HTML page with a reference to a back end service that can provide the image; a browser intercepts the <IMG> tag and follows the SRC link to retrieve the image; the service behind the <IMG> link interprets the request and locates the image in a repository (e.g., scanned documents created as shown in FIG. 10); and an image stream can be buffered and streamed back to the client browser. Accordingly, a straightforward and simple integration of the invention can be accomplished with an existing process whereby a server retrieves or receives an already scanned digital image, which is passed through an image security module, e.g., including ImageMask module, before sending the redacted (masked) image to a client (customer browser).

A preferable embodiment of the invention performs a wrapper function around an existing image content call, for example, when a customer desires to view a cashed check. This Java API function call can take the image and mask relevant parts in accordance with the invention herein before resolving an updated redacted image to an end user. The typical delivery process and image can retain intact, processing time can be negligible and no duplicate images are generated.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for securing a digital image of a check containing sensitive information, the method comprising:
dividing the digital image of the check into a plurality of image fragments according to a predetermined grid to designate a different location within the digital image for each of the plurality of image fragments of the check;
assigning each of the plurality of image fragments with a fragment identifier;
selecting for redaction from a plurality of fragment identifiers at least one fragment identifier representative of at least one image fragment to be redacted; and
automatically redacting, based on said selected fragment identifier, the digital image of the check by rendering indecipherable the selected identifier-based image fragment of the check to substantially secure the sensitive information contained in the portion of the digital image of the check.

2. The method of claim 1, further comprising:
generating a new digital image based on the redaction.

3. The method of claim 1, wherein more than one digital image can be selected and batch redacted in a high throughput automated process.

4. The method of claim 1, the predetermined grid includes at least one of the following:
dividing the selected digital image into image fragments comprising at least one row and at least one column;
dividing the selected digital image into image fragments of rectangular shape; or dividing the selected digital image into image fragments of even size.

5. The method of claim 1 wherein redacting the selected at least one image fragment is based on one of a plurality of redacting techniques, the redacting techniques including: removing, blocking out, crossing out, pixelating, blurring, masking, drawing a line through.

6. The method of claim 1 wherein the selected at least one image fragment is partially redacted.

7. The method of claim 1, wherein selecting at least one image fragment is based on its location within the digital image of the check.

8. A non-transitory computer readable medium containing program instructions for automatically securing a digital image of a check which contains sensitive information, comprising:
program instructions for dividing the digital image of the check into a plurality of image fragments according to a predetermined grid to designate a different location within the digital image for each of the plurality of image fragments of the document type;
program instructions for assigning each of the plurality of image fragments with a fragment identifier;
program instructions for selecting for redaction from a plurality of fragment identifiers at least one fragment identifier representative of at least one image fragment to be redacted; and
program instructions for redacting, based on said selected fragment identifier, the digital image of the check by rendering indecipherable the selected identifier-based image fragment of the check to substantially secure the sensitive information contained in the portion of the digital image of the check.

9. The non-transitory computer readable medium of claim 8, further comprising:
program instructions for generating a new digital image based on the redaction.

10. The non-transitory computer readable medium of claim 1, further comprising program instructions for selecting and batch redacting more than one digital image in a high throughput automated process.

11. The non-transitory computer readable medium of claim 8, wherein dividing the digital image of the check into the plurality of image fragments according to the predetermined grid includes at least one of the following:
dividing the digital image into image fragments comprising at least one row and at least one column;
dividing the digital image into image fragments of rectangular shape; or
dividing the selected digital image into image fragments of even size.

12. The non-transitory computer readable medium of claim 8, further comprising program instructions for selecting for redaction at least one image fragment based on its location within the digital image of the check.

13. The non-transitory computer readable medium of claim 8, further comprising program instructions for redacting the-selected at least one image fragment with one of a plurality of redacting techniques, the redacting techniques including: removing, blocking out, crossing out, pixelating, blurring, masking, and drawing a line through.

14. A method for automatically securing a digital image of a check, comprising:
dividing the first digital image of the check into a plurality of image fragments according to a predetermined grid to designate a different location within the first digital image for each of the plurality of image fragments of selected for the check;
assigning each of the plurality of image fragments with a fragment identifier;
selecting for alteration from a plurality of fragment identifiers at least one fragment identifier representative of at least one image fragment to be altered;
altering at least a portion of at least one image fragment based on its selected fragment identifier; and generating a second digital image of the check wherein the altered identifier-based portion of the second digital image of the check is indecipherable.

15. The method of claim 14, wherein the first image is unaltered after the altering step.

16. The method of claim 14, wherein more than one digital image can be altered within a batch in a high throughput automated process.

17. The method of claim 14, wherein the predetermined grid includes at least one of the following:
   dividing the first digital image into image fragments comprising at least one row and at least one column;
   dividing the first digital image into image fragments of even size; or
   dividing the first digital image into image fragments of rectangular shape.

18. The method of claim 14, wherein altering at least a portion of at least one image fragment is accomplished with one of a plurality of alternation techniques, including: removing, blocking out, crossing out, pixelating, blurring, masking, drawing a line through.

19. The method of claim 14, wherein the fragment identifier is unique to each image fragment.

20. The method of claim 14, wherein altering at least a portion of at least one image fragment is based on its location within the digital image of the check.

\* \* \* \* \*

UNITED STATES PATENT AND TRADEMARK OFFICE
CERTIFICATE OF CORRECTION

Page 1 of 1

PATENT NO. : 8,612,854 B2
APPLICATION NO. : 11/612425
DATED : December 17, 2013
INVENTOR(S) : Eisen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this
Fifth Day of May, 2015

Michelle K. Lee
*Director of the United States Patent and Trademark Office*